United States Patent [19]

Lehar

[11] 4,196,710

[45] Apr. 8, 1980

[54] FUEL DEVICE FOR A GASOLINE ENGINE

[76] Inventor: James J. Lehar, 1915 W. McArthur, Lot #188, Wichita, Kans. 67217

[21] Appl. No.: 847,836

[22] Filed: Nov. 2, 1977

[51] Int. Cl.² ...................... F02M 31/00; F02M 17/18
[52] U.S. Cl. .................................... 123/133; 123/134; 123/122 E; 261/121 B; 261/119 A
[58] Field of Search ................ 123/133, 134, 139 BG, 123/122 H, 122 E; 261/145, 144, 121 A, 121 B

[56] References Cited

U.S. PATENT DOCUMENTS

| 706,454 | 8/1902 | Robinson | 123/134 |
|---|---|---|---|
| 1,530,882 | 3/1925 | Chapin | 123/134 |
| 2,402,080 | 6/1946 | Randall | 123/133 |
| 2,742,886 | 4/1956 | McPherson | 123/133 |
| 2,746,440 | 5/1956 | Eriksen | 123/133 |
| 3,049,850 | 8/1962 | Smith | 123/134 |
| 3,713,429 | 1/1973 | Dwyre | 123/134 |
| 3,968,775 | 7/1976 | Harpman | 123/122 F |
| 3,986,486 | 10/1976 | Rabbiose | 123/133 |

*Primary Examiner*—Ronald H. Lazarus
*Attorney, Agent, or Firm*—John H. Widdowson

[57] ABSTRACT

A fuel device for a gasoline engine. The device eliminating the use of a carburetor on the engine and supplying the engine's intake manifold with an air fuel mixture pre-heated in a reactor housing. The air fuel mixture being heated by the engine's cooling system.

2 Claims, 7 Drawing Figures

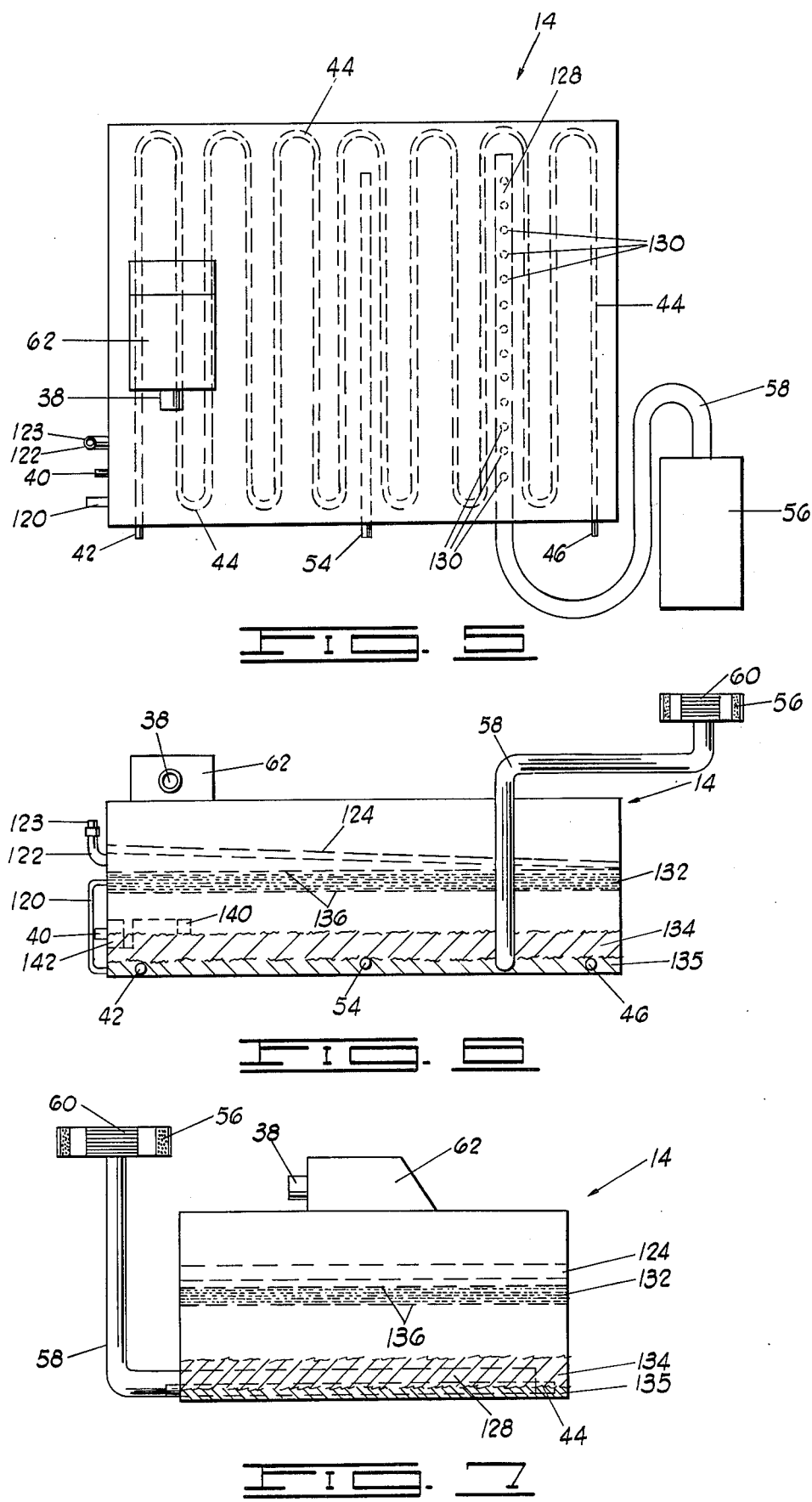

FUEL DEVICE FOR A GASOLINE ENGINE

BACKGROUND OF THE INVENTION

This invention relates to an improved fuel device for a gasoline engine and more particularly, but not by way of limitation, to the heating of non-leaded gasoline, alcohol, or the like, which is mixed with air and introduced directly through a throttle housing into the intake manifold of the engine.

Heretofore there have been various types of fuel supply systems, apparatus, and methods of pre-heating air fuel mixtures for supplying an internal combustion engine. These devices provide a more efficient system for improving the efficiency of the internal combustion engine. In particular U.S. Pat. No. 3,713,429 to Dwyre discloses a fuel economizer system for a gasoline engine. In this system, gasoline is heated in an auxiliary tank heated by a fluid heated by the engine. The heated fluid may be the engine's hot water from the cooling system or from exhaust gas from the engine. Air is introduced into the fuel in the auxiliary tank, and the vapors from the tank are distributed to the engine's carburetor.

While some of the features in the Dwyre patent are similar to the subject invention, the invention eliminates the use of the engine carburetor and provides specific advantages and structural differences for a more efficient means of supplying an air fuel mixture to the engine. cl SUMMARY OF THE INVENTION The subject invention provides a more efficient system for supplying a complete air fuel mixture which is completely burned in the engine thereby reducing incomplete combustion in the engine and producing greater gas mileage.

The invention supplies the engine with a heated air fuel mixture in a vapor form thereby eliminating the need of a carburetor. The invention provides a novel throttle housing having a plurality of butterfly valves for accurately controlling the amount of air mixed with the air fuel mixture.

A reactor housing which supplies the air fuel mixture to the engine provides for pre-heating the air fuel mixture and collecting any condensed fuel prior to the air fuel mixture being supplied to the throttle housing. The invention also provides for cold weather starting by pre-heating the fuel supply to the reactor housing and also supplying liquid fuel directly to the throttle housing until the engine temperature is increased so that the air fuel mixture can be supplied directly from the reactor housing.

The fuel device for a gasoline engine includes a throttle housing mounted on top of the engine and communicably connected to the intake manifold. The housing includes an air intake port for receiving air and includes a choke butterfly valve connected to the engine's choke and an air intake butterfly valve attached to the accelerator pedal of the engine. The housing further includes an air fuel intake port for receiving the air fuel mixture. An air fuel butterfly valve is mounted in the air fuel intake port and is pivotally attached to the air intake butterfly valve and is responsive to the movement of the air intake butterfly valve. A reactor housing for supplying the air fuel mixture to the engine is communicably connected to the fuel tank of the engine by a reactor fuel supply line. An air fuel supply line is connected to the reactor housing and the air fuel intake port for supplying the air fuel mixture thereto. A hot water supply line and a hot water return line are connected to the engine's cooling system for supplying hot water to a coiled water circulating line mounted in the bottom of the reactor housing. The coiled water circulating line heats the fuel in the reactor housing into a vapor. A reactor housing air filter is mounted adjacent the reactor housing and communicably connected to the reactor housing for supplying air which is mixed with the fuel in the reactor housing.

The advantages and objects of the invention will become evident from the following detailed description when read in conjunction with the accompanying drawings which illustrate the preferred embodiments of the invention.

BRIEF DESCRIPTION OF THE DRAWINGS

FIG. 5 is a top view of the reactor housing.

FIG. 6 is a side view of the reactor housing.

FIG. 7 is an end view of the reactor housing.

DETAILED DESCRIPTION OF THE DRAWINGS

Figure 1:
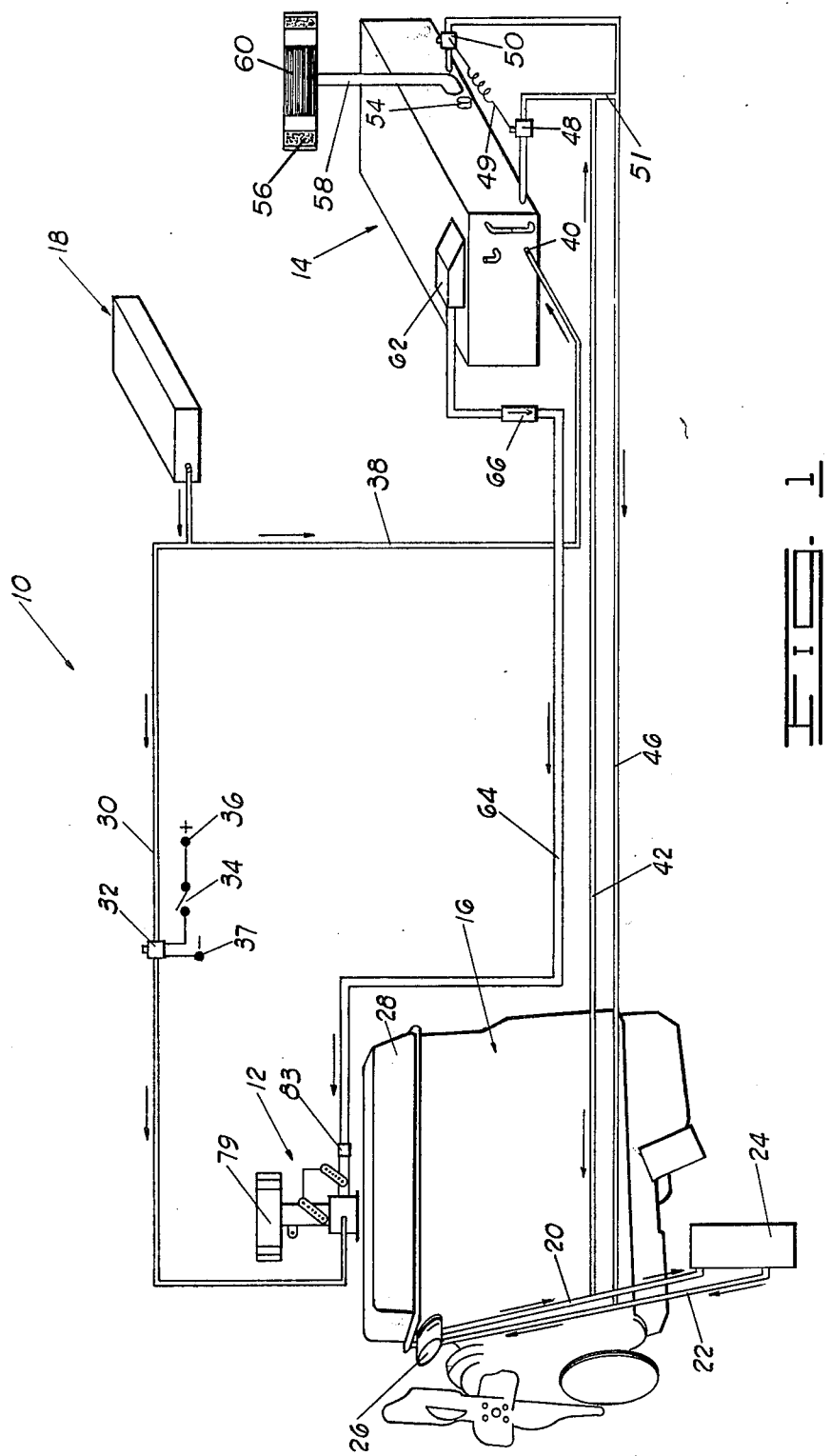
In FIG. 1, a diagram of the fuel device attached to the gasoline engine, the gasoline engine's heater, and the gasoline engine's fuel tank is illustrated.

In FIG. 1, the fuel device for a gasoline engine is designated broadly by general reference numeral 10. The device 10 includes a throttle housing 12 and a reactor housing 14 which are connected to a gasoline engine 16, a fuel tank 18, and supply line 20, and return line 22 attached to a vehicle heater 24. The lines 20 and 22 are attached to an engine water pump 26 mounted on the engine 16.

The throttle housing 12 is mounted on top of an engine manifold 28. The fuel tank 18 is connected to the throttle housing 12 by an engine fuel supply line 30. The line 30 includes an electric solenoid valve 32 connected to an electric switch 34 having terminals 36 and 37 attached to the engine's battery which is not shown in the drawings. The solenoid valve 32 is open for supplying liquid fuel directly to the throttle housing 12 during cold start operations. When the engine 16 reaches normal operating temperatures (i.e. 100°–120° F.), the valve 32 closes and the device 10 begins supplying a vaporized air fuel mixture directly to the engine manifold 28 for running the engine 16.

Under normal operating conditions, the fuel tank 18 supplies fuel to the reactor housing 14 through a reactor fuel supply line 38 which is attached to a fuel supply line inlet tube 40 mounted in the side of the housing 14. The fuel in the reactor housing 14 is heated by circulating water through a hot water supply line 42 which is attached to supply line 22 and to a coiled water circulating line 44 shown in FIG. 5. The other end of the coiled water circulating line 44 is attached to a hot water return line 46 which in turn is connected to the water return line 22.

The temperature of the hot water in the lines 42 and 46 is monitored by a water temperature control valve 48 which is electrically wired by lead 49 to a heat sensing element 50 attached to the return line 46. The water temperature control valve 48 closes to maintain a maximum temperature of 100°–120° F. in the line 44. To further aid in the fuel economy on runs of over two feet in length, the line 64 is encompassed by the hot water supply line 42 to prevent the vaporized fuel from condensing back to liquid. A bypass 51 is connected between the supply line 42 and return line 46 to allow circulation of hot water when valve 48 is closed.

To further aid in heating the fuel in the reactor housing 14 for cold starts is a heating element 54 disposed inside the reactor housing 14 and connected to the engine's battery for heating the fuel therein. The fuel inside the reactor housing 14 is mixed with air received through a reactor housing air filter 56 mounted on top of an air filter tube 58. The air filter 56 includes a flame arrestor 60 which is used to prevent the ignition of fuel vapors escaping upwardly through the air tube 58 when the device 10 is not in operation.

The air received through the air filter tube 58 is mixed with the fuel and heated forming an air fuel mixture which is discharged through a reactor housing plenum 62 mounted on the top of the housing 14 and connected to one end of an air fuel supply line 64. The supply line 64 feeds the vaporized air fuel mixture directly into the throttle housing 12 thereby eliminating the need of a carburetor. The supply line 64 includes the safety feature of a check valve 66 mounted in the line 64. The check valve 66 allows the air fuel mixture to flow into the throttle housing 12 but closes when there is a reverse flow of the air fuel mixture due to a backfire in the engine manifold 28. The valve 66 prevents a possible explosion and the destruction of the reactor housing 14.

Figure 2:
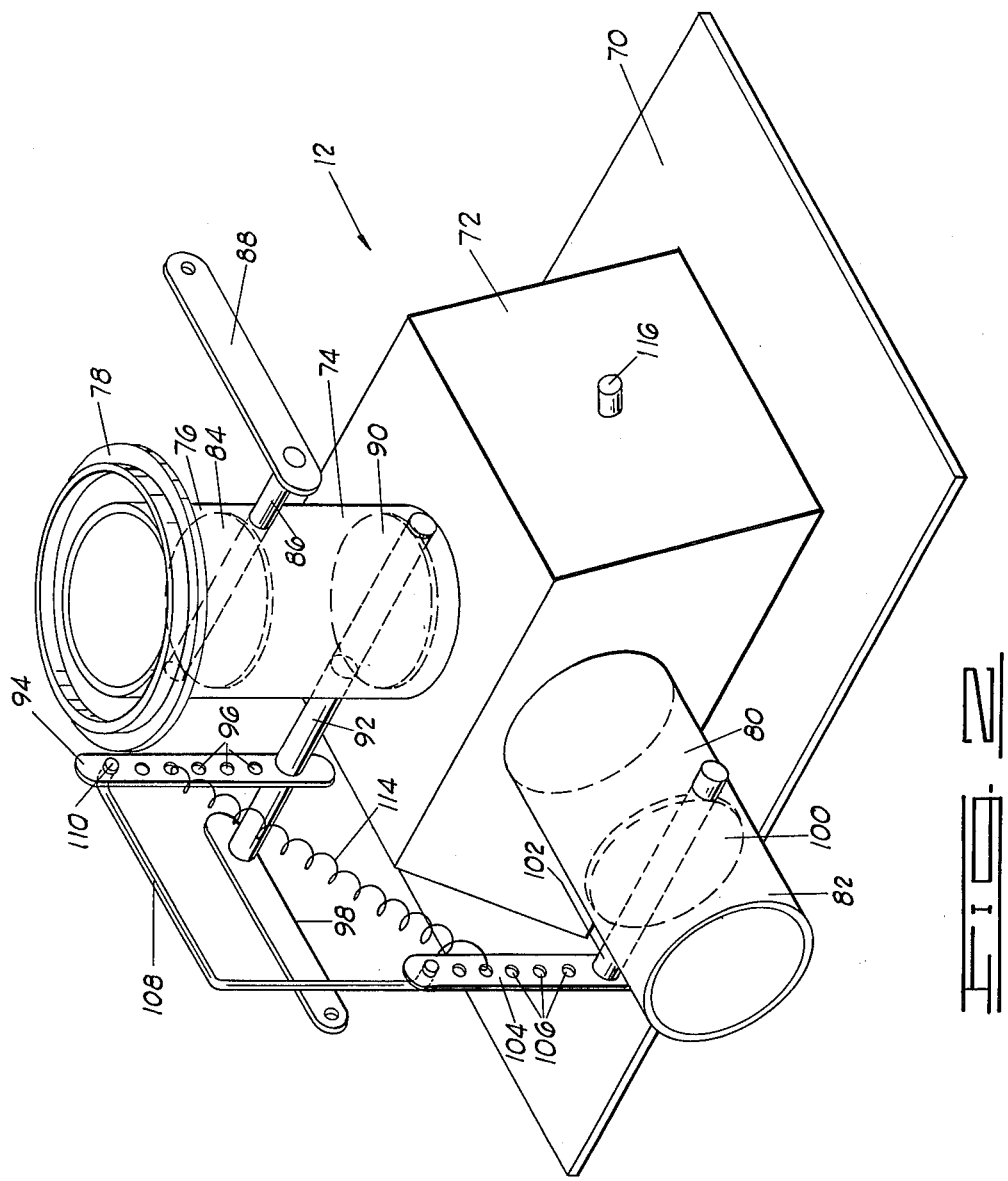
In FIG. 2, a perspective view of the fuel device's throttle housing is illustrated.

In FIG. 2, a perspective view of the throttle housing 12 is illustrated. The throttle housing 12 includes a manifold adaptor 70 for mounting on top of the engine manifold 28. Mounted on top of the manifold adapter 70 is a plenum 72 having an upwardly extending air intake port 74 with an upper end portion 76 having an air cleaner adaptor 78 mounted thereon for receiving an air cleaner 79. The air cleaner 79 is shown in FIG. 1.

Extending outwardly from the side of the plenum 72 is an air fuel intake port 80 having an end portion 82 which is attached to the air fuel supply line 64 by a rubber flexible coupling 83 for receiving the air fuel mixture therein. The coupling 83 is shown in FIG. 1 and absorbs any vibration transmitted from the engine 16 to the line 64.

Mounted in the upper portion of the air intake port 74 is a choke butterfly valve 84 shown in dotted lines and mounted therein and attached to a shaft 86 having a choke lever 88 attached thereto. The choke lever 88 may be attached to a manual choke or an electrically operated choke for automatically or manually choking the engine during cold weather starting.

Disposed below the choke butterfly valve 84 and parallel thereto is an intake butterfly valve 90 shown in dotted lines and pivotally mounted on a shaft 92. The shaft 92 is attached to an air intake lever 94 having a plurality of aperatures 96 therein. Mounted on the end of the shaft 92 is a linkage arm 98 which is attached to the accelerator pedal of the engine 16. The connection between the pedal and the linkage arm 98 is not shown in the drawing. As the accelerator pedal is pushed downward thereby accelerating the engine 16, the linkage arm 98 is pivoted downwardly thereby opening the air intake butterfly valve 90 increasing the amount of intake air through the air intake port 74.

The air fuel intake port 80 includes an air fuel intake butterfly valve 100 shown in dotted lines which is used for controlling the amount of air fuel mixture received into the plenum 72. The butterfly valve 100 includes a shaft 102 extending outwardly from the port 80 and having an air fuel intake lever 104 attached thereto and including a plurality of aperatures 106. The lever 106 is attached to the air intake lever 94 by an "L"-shaped lever arm 108 having a first end portion 110 received in the aperatures 96 and a second end portion 112 received in the aperatures 106 of the lever 104.

By connecting the air intake lever 94 with the air fuel intake lever 104 through lever arm 108, the air fuel intake butterfly valve 100 is responsive to the movement of the air intake butterfly valve 90 and is opened and closed in response to the acceleration of the engine. By adjusting the lever arm 108 in the aperatures 96 and 106, the correct ratio of intake air through the air intake port 74 may be regulated with the air fuel mixture received through the air fuel intake port 80. The levers 94 and 104 are also attached to the ends of a coil spring 114 which is used to eliminate any play between the levers 94 and 104.

Mounted on one side of the plenum 72 is a liquid fuel intake port 116 having a meter valve disposed therein which is attached to the fuel supply line 30 for receiving liquid fuel directly into the engine 16 during the cold starting of the engine 16.

Figure 3:
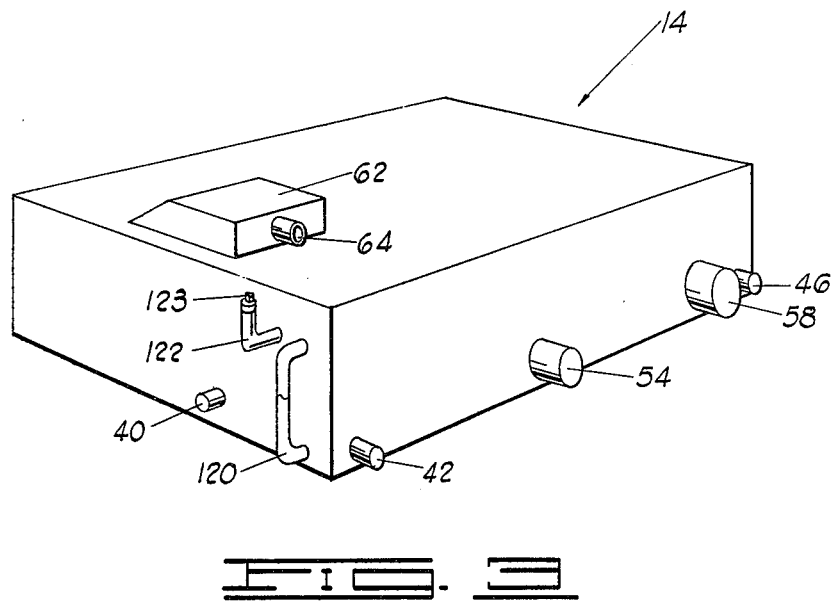
FIG. 3 is a perspective view of the reactor housing.

In FIG. 3, a perspective view of the reactor housing 14 is illustrated. In this view, the reactor housing plenum 62 can be seen attached to the top of the housing 14 with a portion of the air fuel supply line 64 extending outwardly therefrom. Also shown extending outwardly from one of the reactor housing sides is the heating element 54, the air filter tube 58, the hot water supply tube 42, and the hot water return line 46.

Mounted on an adjacent side of the reactor housing 14 is a sight glass tube 120. Adjacent the sight glass tube 120 is a water standpipe tube 122 and threaded cap 123 which is used for adding small amounts of water to the fuel in the reactor housing 14 for providing a fuel water mixture. The water mixed with the fuel is evaporated into steam in the engine 16 and assists in providing a more complete combustable fuel mixture. The sight glass tube 120 is used for viewing the liquid level of the water and fuel in the bottom of the reactor housing 14.

Figure 4:
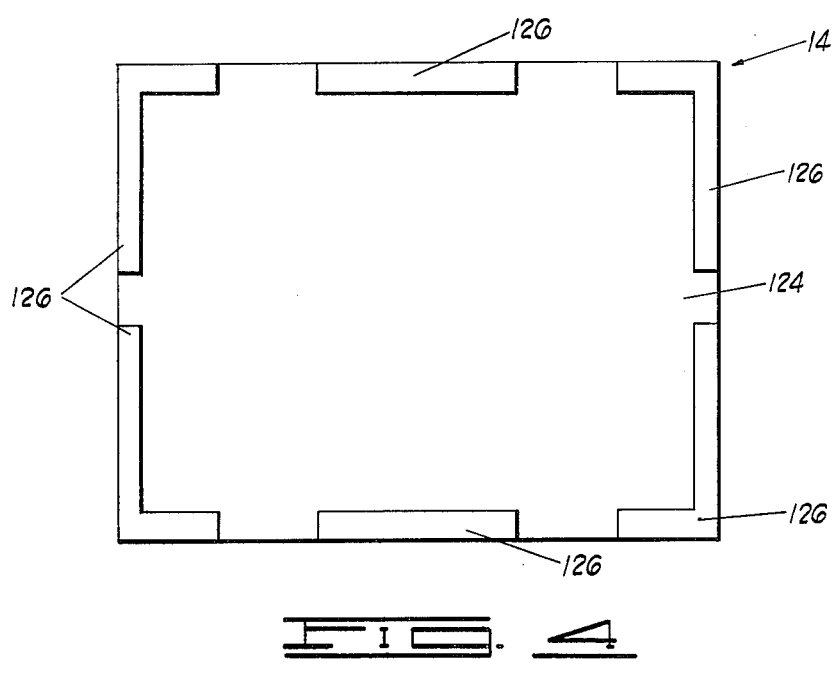
FIG. 4 is a top view of a baffle mounted in the top of the reactor housing.

In FIG. 4. a top view of the reactor housing 14 is illustrated with the top of the housing 14 removed showing a metal baffle 124 having openings 126 along the sides of the baffle 124. The vaporized air fuel mixture rises in the reactor housing 14 and is circulated through the openings 126 where it is discharged through the reactor housing plenum 62. Should there be any condensation of the fuel as it rises, the fuel is collected on the baffle 124 and is drained downwardly back into the liquid fuel level in the bottom of the reactor housing 14.

In FIG. 5, a top view of the reactor housing 14 is illustrated with the baffle 124 removed and illustrating the coiled water circulating line 44 connected to the hot water supply line 42 and the hot water return line 46. Also seen in this view is an end portion 128 of the air filter tube 58 having a plurality of aperatures 130 therein. The aperatures 130 circulate air received through the air filter 56 into the liquid fuel in the bottom of the reactor housing 14.

In FIG. 6, a side view of the reactor housing 14 is illustrated and showing in dotted lines a fuel fiberglass filter 132 disposed above a fuel level 134 shown in the bottom of the housing 14. This filter aids in vaporization of the fuel. Below the fuel level is shown a water level 135. The filter 132 includes wire mesh 136 disposed on the top and bottom of the filter 132. The wire mesh 136 is shown in dotted lines. As the air fuel mixture is vaporized and rises, the fuel filter 132 acts to filter any condensed liquid fuel out of the vapor mixture and returns the liquid fuel to the liquid level 134. Mounted above the filter 132 is the baffle 124 shown in dotted lines and discussed under FIG. 4 at an angle from the horizontal for returning the fuel to the fuel level 134. The liquid level of the fuel in the reactor housing 14 is controlled by a float 140 shown in dotted lines and attached to a float valve 142. The valve 142 is communicable connected to the fuel supply line 38 at inlet tube 40. When the desired level is reached, the float valve 142 shuts off the supply line 38 until fuel again is required in the housing 14.

In FIG. 7, an end view of the housing 14 is illustrated. This view is similar to the view in FIG. 6 and again shows the reactor housing plenum 62 mounted on top of the housing 14. Shown in dotted lines is the baffle 124 disposed above the fiberglass filter 132. Also shown in dotted lines is the coiled water circulating line 44 and the end portion 128 of the air filter tube 58.

Changes may be made in the construction and arrangement of the parts or elements of the embodiment as disclosed herein without departing from the spirit or scope of the invention as defined in the following claims.

I claim:

1. A fuel device for a gasoline engine, the device communicably connected to the engine's intake manifold, the engine's fuel tank, and the engine's cooling system, the device comprising;

a throttle housing mounted on top of the engine and communicably connected to the intake manifold, the housing having an air intake port for receiving air, said air intake port including an air cleaner adapter mounted on the top thereof for receiving an air cleaner thereon, said air intake port further including a choke butterfly valve and an air intake butterfly valve mounted therein, said choke butterfly valve attached to a choke of the engine for controlling the amount of air received in the air intake port, said air intake butterfly valve connected to an accelerator pedal of the engine, said air intake butterfly valve attached to a shaft extending outwardly from said air intake port with an air intake lever mounted thereon, the housing further including an air fuel intake port for receiving an air fuel mixture, said air fuel intake port having an air fuel butterfly valve mounted therein, said air fuel butterfly valve pivotally mounted on a shaft extending outwardly from said air fuel intake port and attached to an air fuel intake lever, said air fuel intake lever connected to one end of a lever arm, the other end of said lever arm connected to said air intake lever so that when said air intake butterfly valve is opened said air fuel intake butterfly valve in turn is opened;

a reactor housing for supplying the air fuel mixture to said throttle housing, said reactor housing communicably connected to the fuel tank by a reactor fuel supply line, said supply line supplying fuel to said reactor housing;

an air fuel supply line connected to said reactor housing and said air fuel intake port for supplying the air fuel mixture to said throttle housing;

a hot water supply line and a hot water return line connected to the engine's cooling system, said supply and return lines connected to a coiled water circulating line mounted in the bottom of said reactor housing for heating the fuel in the reactor housing;

a reactor housing air filter mounted adjacent said reactor housing and communicably connected to said reactor housing by an air filter tube having a plurality of apertures therein for supplying air into the fuel in said reactor housing;

a float valve mounted inside said reactor housing and communicably connected to said reactor fuel supply line for maintaining a constant level of fuel in the bottom of said reactor housing;

a fuel filter mounted in said reactor housing and disposed above the fuel level in the reactor housing to aid in vaporizing the fuel;

a baffle mounted in the reactor housing and disposed above said fuel filter for collecting fuel as it is condensed in the top of said reactor housing;

a reactor housing plenum mounted on top of said reactor housing and communicably connected to the inside of said reactor housing and connected to said air fuel supply line, said plenum receiving the heated air fuel mixture therein and discharging the air fuel mixture into said air fuel supply line;

an air fuel check valve mounted in the air fuel supply line, said check valve open when supplying the air fuel mixture to said throttle assembly, said check valve closed to prevent the reverse flow of the air fuel mixture to said reactor housing when a backfire occurs in the intake manifold; and a temperature control valve mounted in the water supply line and wired to a sensing element on the hot water return line for sensing the water temperature circulated through said coiled water circulating line;

a heating element disposed inside said reactor housing and connected to the battery of said engine;

said air intake lever and said air fuel intake lever include a plurality of apertures for receiving the ends of said lever arm therein for adjusting the movement of the air intake butterfly valve in relation to the movement of the air fuel intake butterfly valve for regulating the amount of air received through the air intake port in relationship to the amount of air fuel mixture received through said air fuel intake port;

said fuel filter is fiberglass and comprises a wire mesh disposed on the top and bottom thereof.

2. A fuel device for a gasoline engine, the device communicably connected to the engine's intake manifold, the engine's fuel tank, and the engine's cooling system, the device comprising;

a throttle housing mounted on the engine and communicably connected to the intake manifold, said housing having an air intake port for receiving air, said air intake port further including a choke control valve and an air intake control valve mounted therein, said choke control valve attached to a choke of the engine for controlling the amount of air received in the air intake port, said air intake control valve connected to an accelerator means for said engine, said air intake control valve attached to means extending outwardly from said air intake port with an air intake control means mounted thereon, the housing further including an air fuel intake port for receiving an air fuel mixture, said air fuel intake port having an air fuel control valve mounted therein, said air fuel control valve operatively mounted on means extending outwardly from said air fuel intake port and attached to an air fuel intake control means, said air fuel intake control means connected to one end of a connecting means, the other end of said connecting means connected to said air intake control means so that when said air intake control valve is opened said air fuel intake control valve in turn is opened;

a reactor housing for supplying an air fuel mixture to said throttle housing, said reactor housing communicably connected to said fuel tank by a reactor fuel supply line, said supply line supplying fuel to said reactor housing;

an air fuel supply line connected to said reactor housing and said air fuel intake port for supplying an air fuel mixture to said throttle housing;

a hot aqueous fluid supply line and a hot aqueous fluid return line connected to said engine's cooling system, said supply and return lines connected to an aqueous fluid circulating means mounted in the bottom of said reactor housing for heating the fuel in said reactor housing;

a reactor housing air inlet conduit means having a plurality of outlets communicably connected to said reactor housing for supplying air into the fuel in said reactor housing;

liquid level control means mounted inside said reactor housing and communicably connected to said reactor fuel supply line for maintaining a substantially constant level of fuel in the bottom of said reactor housing;

fuel filter means mounted in said reactor housing and disposed above the fuel level in said reactor housing;

means in the reactor housing disposed above said fuel filter means for collecting fuel condensed in the upper portion of said reactor housing;

said reactor housing having a plenum communicably connected to said air fuel supply line, in operation said plenum receiving heated air fuel mixture therein and discharging said air fuel mixture into said air fuel supply line;

an air fuel check valve means mounted in said air fuel supply line, said check valve means open when supplying said air fuel mixture to the throttle assembly, said check valve means closed to prevent reverse flow of said air fuel mixture to said reactor housing when a backfire occurs in said intake manifold; and temperature control means mounted in said hot aqueous fluid supply line and operatively connected to said hot aqueous fluid return line for controlling hot aqueous fluid temperature circulated through said aqueous fluid circulating means;

heating means disposed inside said reactor housing and connected to an electrical power supply means of said engine.

said air intake control means and said air fuel intake control means include means for adjusting the movement of said air intake control valve in relation to the movement of the air fuel intake control valve for regulating the amount of air received through said air intake port in relationship to the amount of air fuel mixture received through said air fuel intake port.

* * * * *